Figure 1:
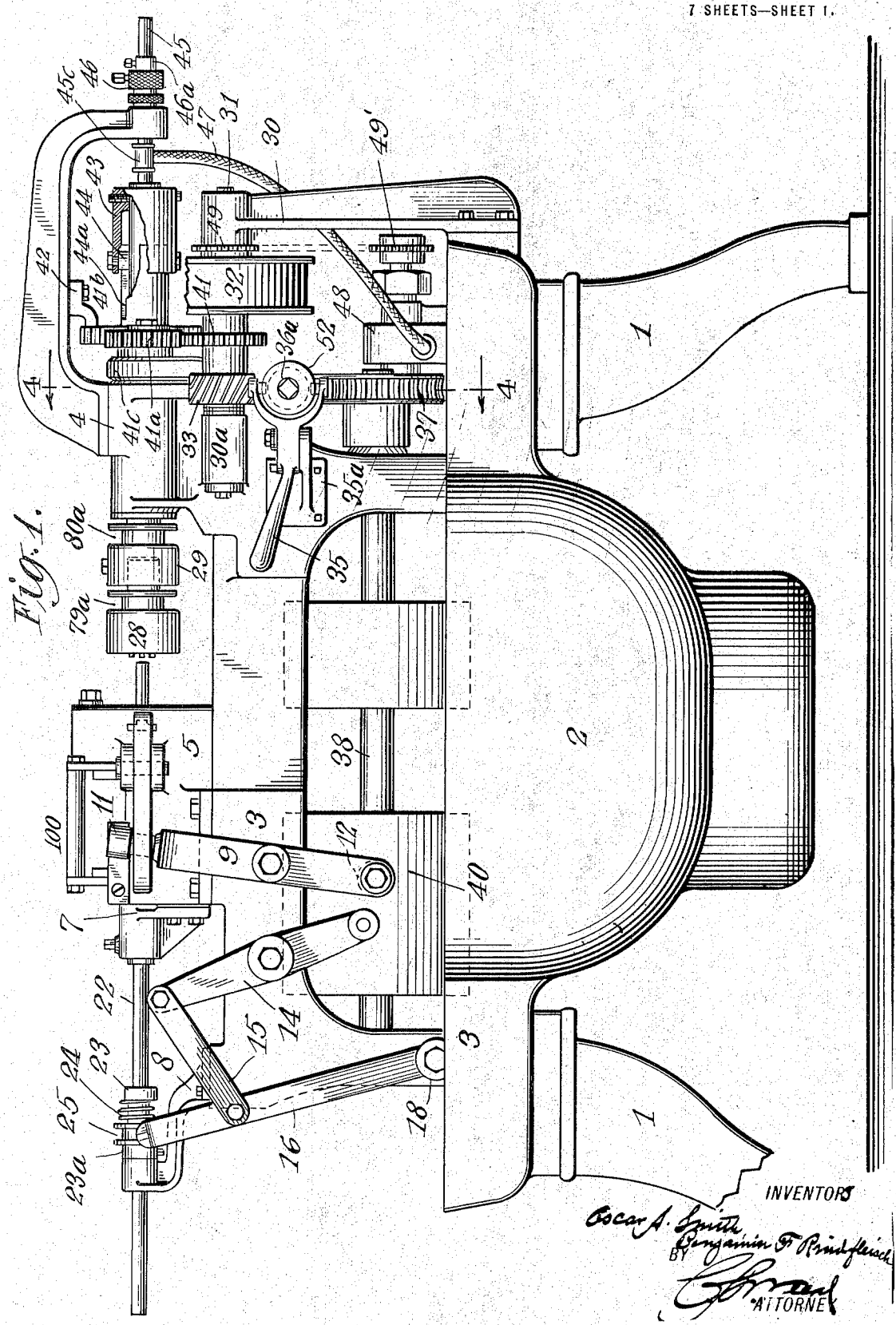

O. A. SMITH AND B. F. RINDFLEISCH.
STUD THREADING MACHINE.
APPLICATION FILED APR. 13, 1917.

1,315,427.

Patented Sept. 9, 1919.
7 SHEETS—SHEET 1.

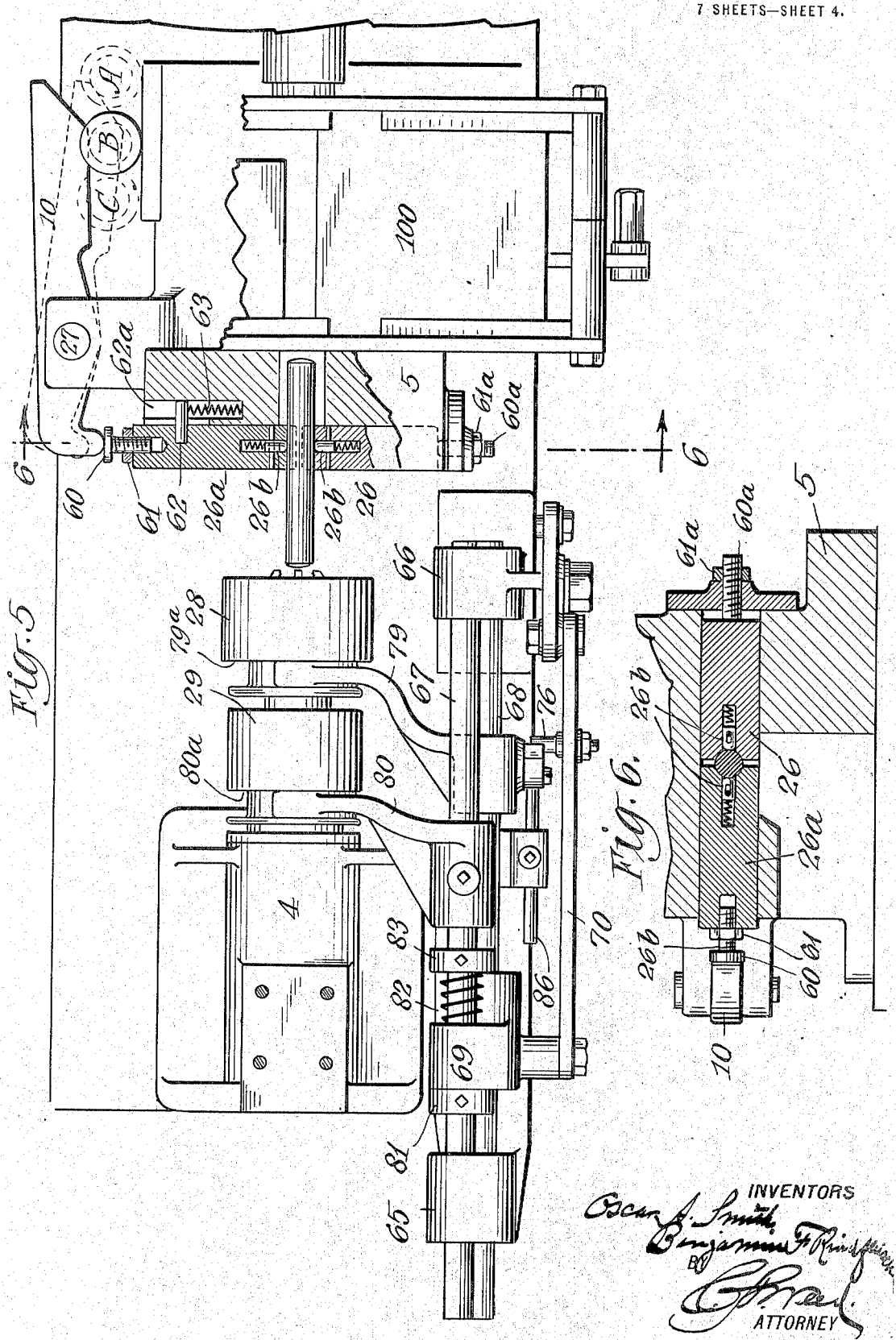

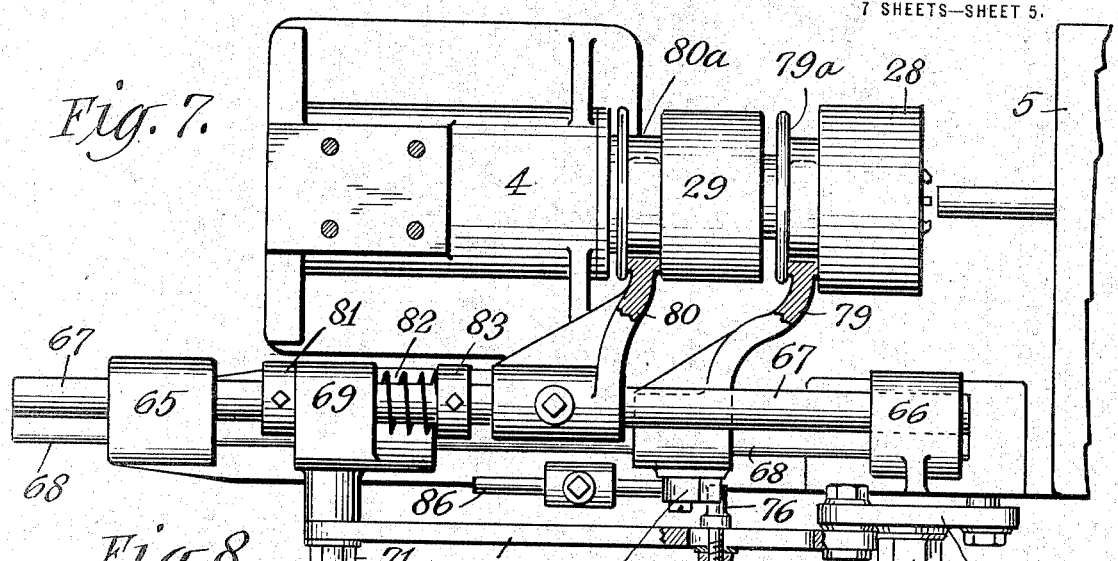
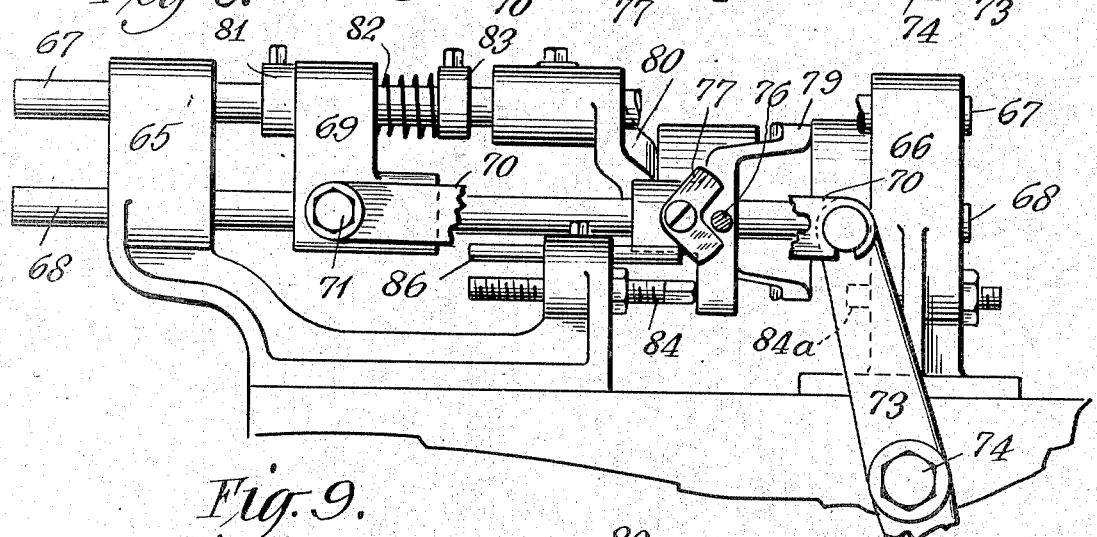
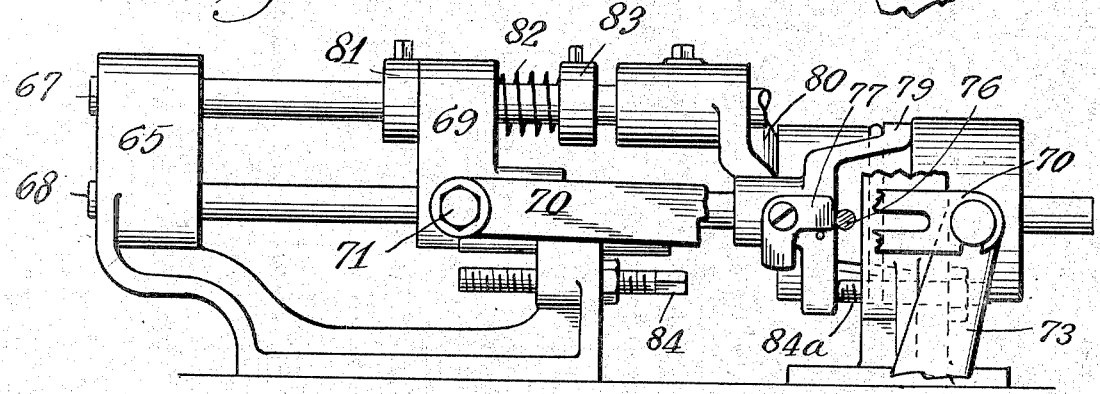

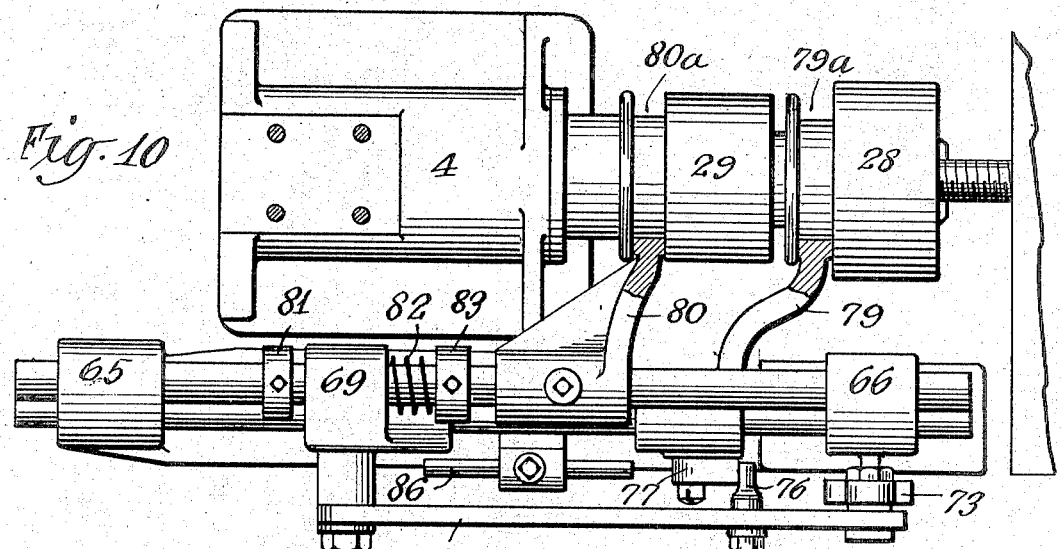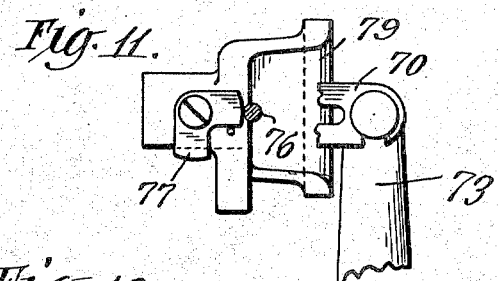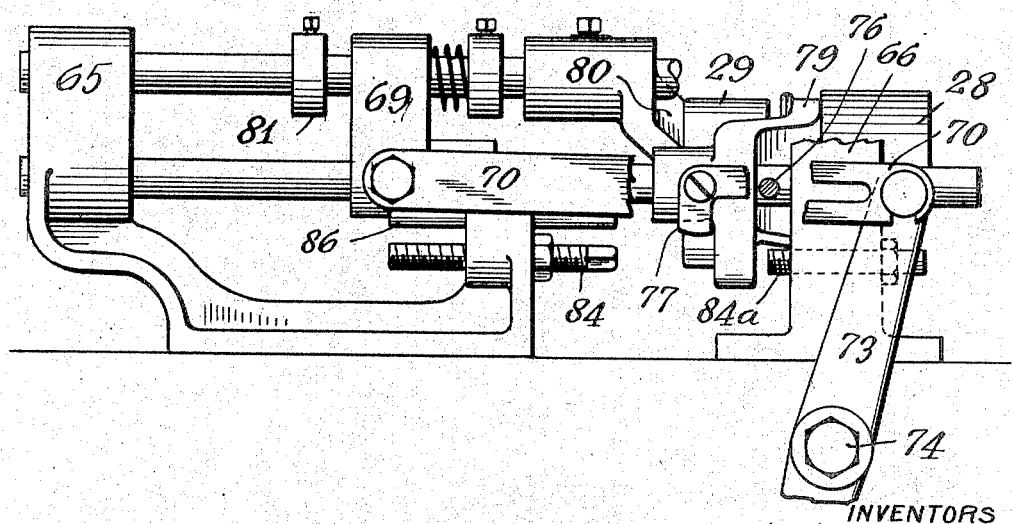

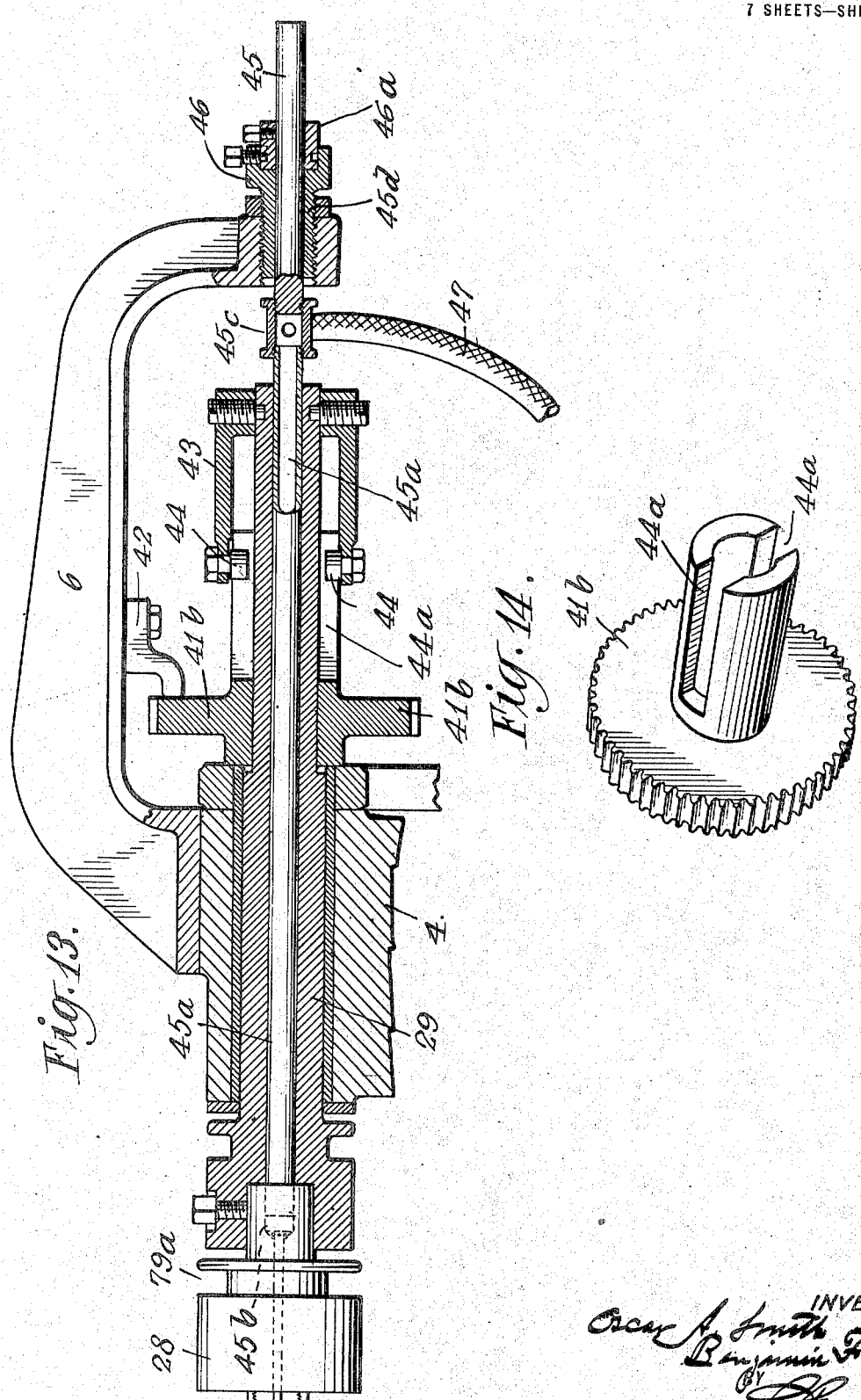

UNITED STATES PATENT OFFICE.

OSCAR A. SMITH AND BENJAMIN F. RINDFLEISCH, OF CLEVELAND, OHIO, ASSIGNORS TO THE NATIONAL ACME COMPANY, OF CLEVELAND, OHIO, A CORPORATION OF OHIO.

STUD-THREADING MACHINE.

1,315,427.        Specification of Letters Patent.        Patented Sept. 9, 1919.

Application filed April 13, 1917. Serial No. 161,723.

*To all whom it may concern:*

Be it known that we, OSCAR A. SMITH and BENJAMIN F. RINDFLEISCH, both citizens of the United States, residing at Cleveland, in the county of Cuyahoga and State of Ohio, have invented certain new and useful Improvements in Stud-Threading Machines, of which the following is a specification.

This invention relates to metal working machines, more particularly to that general class known as threading machines for automatically cutting threads on studs, screws, bolts and similar articles, and frequently designated as automatic stud threading machines, the primary object of the invention being to provide a simple but effective machine having the least possible mechanical movements and parts thereby to obtain a very rapid production of product.
Another object of the invention is the provision of an improved feeding means for the stock and a non-movable positive stop thereby to eliminate the time heretofore lost in bringing a movable or swinging stop into position and then shifting it out of the way of the stock again.

Another improvement resides in a non-frictional, non-cramping mechanism for driving the die spindle.
Another improvement resides in a new and powerful gripping mechanism for the blank.

Another improvement resides in a die safety tripping device.

Another improvement resides in the combination of stop and oiling mechanism.

This improved machine eliminates a great many movements heretofore necessary on machines of this general type. Heretofore it has been the practice in machines of this type to use a swinging or oscillating work stop, such for instance as that shown and described in the patent of Oscar A. Smith, No. 1,153,456, dated September 14, 1916.

In the present machine, the use of a swinging or oscillating stop is eliminated. In consequence the die spindle does not have to be carried back any farther than just enough to clear the work as the stop is in the center of the die and remains there, and consequently it is not necessary to wait for an oscillating stop to be shifted into position and away from its stopping position. This results in a great saving in time and also elimi-
nates the time in feeding the work since it is not necessary to wait for the stop to be shifted into place and back again. In other words, the feeding can be accomplished much quicker. In the machine disclosed in the patent above referred to, the stop has to be swung into its operative position and away therefrom and the die spindle has to travel back far enough to clear such stop and it can not go forward again until this stop has been swung into its operative position and away therefrom, nor can the stock be fed until the stop has been swung into its operative position, and we have found by actual test of the patented machine that the speed of threading a piece of work three-eighths inch in diameter with one inch length of thread was at the rate of nine hundred per hour, whereas the same identical piece of work on the present improved machine can be threaded at the rate of eighteen hundred per hour, just twice as many with the same spindle or die speed in both instances. It thus follows that the present improved machine doubles the output.

Moreover another important feature of the present machine is the manner of driving the die spindle by the means disclosed for connecting the die spindle with the driving mechanism. All cramping due to driving the spindle through keys connecting it with the die spindle shaft is entirely eliminated, as the rollers and slots hereinafter described eliminate all friction due to the use of connecting keys.

Moreover the present machine, as stated eliminates a great many mechanical movements of the parts, so that the present improved machine can be manufactured for practically one-half the cost of the patented machine and yet double the output of such machine.

Figure 2:
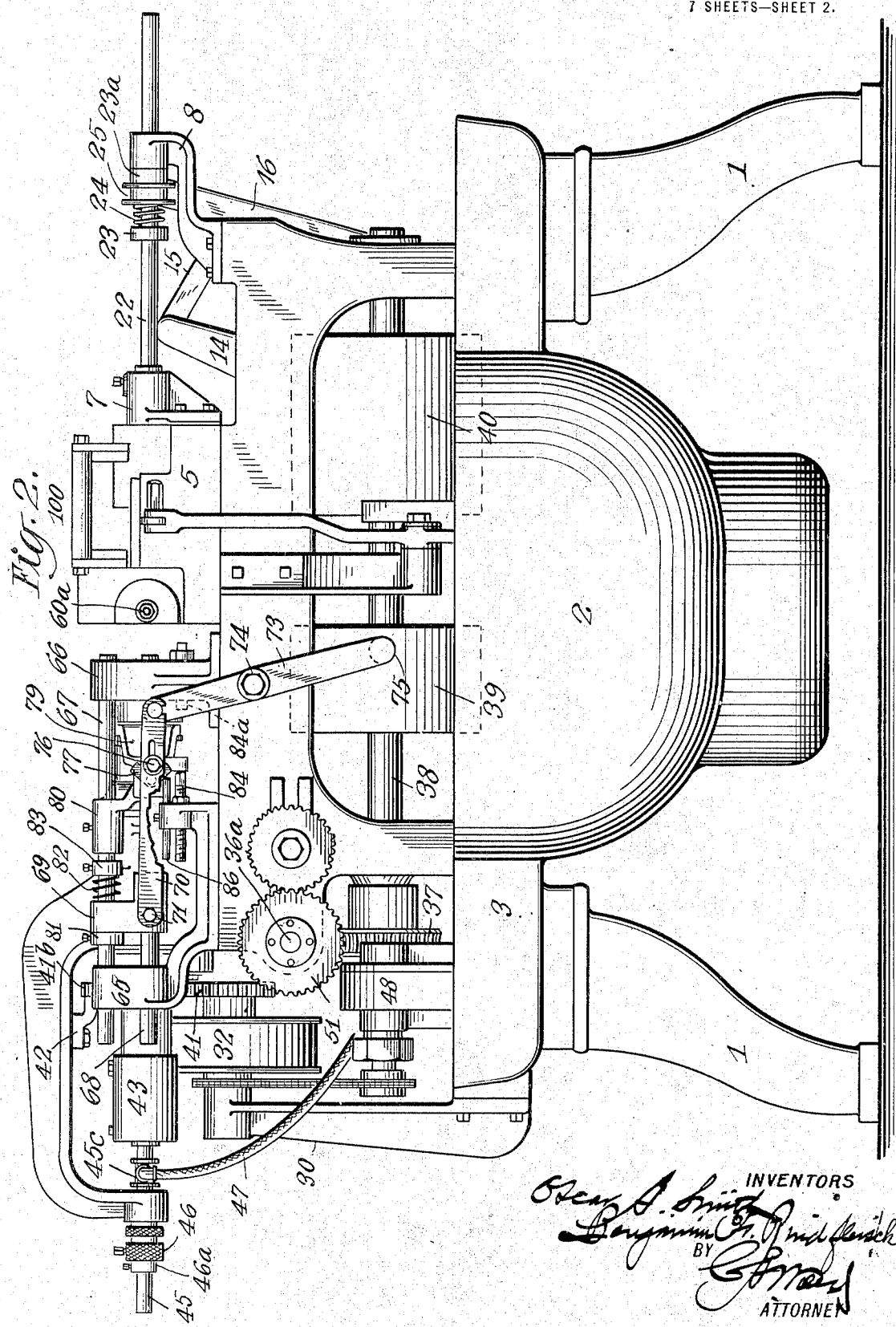
Figure 3:
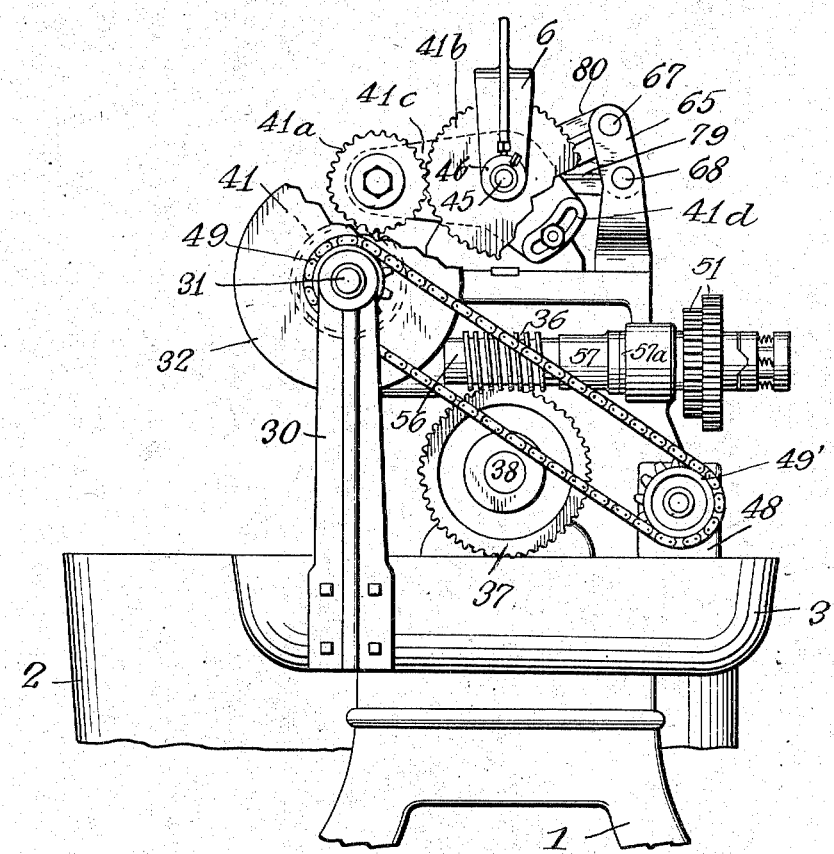
Figure 4:
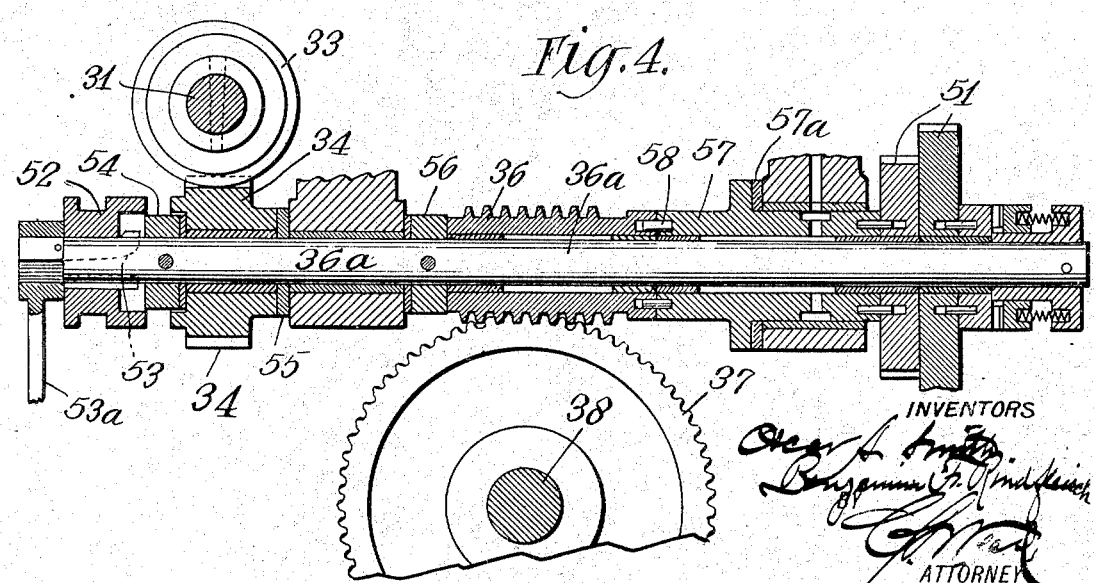

In the drawings accompanying and forming a part of this specification, Figure 1 is a side elevation of this improved machine; Fig. 2 is an opposite side elevation of the machine; Fig. 3 is a rear end view or an end view of the driving end of the machine; Fig. 4 is a cross sectional view taken on line 4—4 of Fig. 1 and illustrating the worm shaft mechanism; Fig. 5 is a plan view of the machine, the work gripping means being partly shown in section; Fig. 6 is a cross sectional view taken on line 6—6 of Fig. 5 and illustrating in section the work gripping means; Fig. 7 is a plan view, Figs. 8 and 9 are side views, Fig. 10 is a plan view and Figs. 11 and 12 are side views, all illustrating the means for shifting the die and die spindle and the safety mechanism and illustrate the mechanism when the die is working properly and when it is not, as hereinafter described; Fig. 13 is a sectional view of the die spindle; and Fig. 14 is a perspective view illustrating a part of the connections' between the die spindle and the means for rotating it.

Similar characters of reference indicate corresponding parts in the several figures of the drawings.

In the preferred form thereof, herein shown and described, it comprises a bed 3 having suitable legs 1 and pan 2. On top and at one end of the bed 3 is bolted a block 5 carrying the gripping mechanism. Opposite this block 5 and bolted to the other end of the bed 3 is a spindle housing 4. Improved means for gripping the stock is provided, this being carried as just stated by the block 5 (see Figs. 5 and 6). Machined in the block 5 at right angles to the length of the bed and adjacent to the face of the block opposite the threading die and at a suitable distance from the top of the block 5, is machined a suitable tongued recess in which are located the gripping blocks comprising two blocks opposing each other, one block of which, as 26, is firmly fastened against movement except by an adjusting means provided for the purpose, while the other block 26$^a$ is mounted to slide backward and forward. At the outer end of the sliding block 26$^a$ is located an adjustable screw 60 hereinafter referred to and in a suitable slot of an extended bearing of block 5 and parallel with the face and bed is pivotally supported, as at 27, a grip block operating lever 10. Pivoted to the side of the bed by a bolt 13 is a grip operating and locking lever 9 (see Fig. 1). To the upper end of this lever is secured a roller 11 having two different diameters. The upper portion or large diameter of the roller has a bearing against a suitable steel plate bolted to the grip block 5. The smaller diameter of the roller is in position to contact with a suitable cam on the end of the lever 10. To the lower end of lever 9 is secured a suitable stud and roller 12 in position to be engaged by suitable cams not shown on the cam drum 40 mounted on a cam shaft 38. At a suitable distance from the lever 9 and substantially parallel therewith is a feed lever 14 bolted to the bed 3. To the upper end of this lever 14 is pivotally secured one end of a link 15, the opposite end of which is pivotally secured to an auxiliary feed lever 16, which is pivotally secured at its lower end as at 18, to the bed of the machine. To the upper end of auxiliary feed lever 16 is pivotally secured a dog or shoe in position to project into a grooved spool 25. To the extreme rear end of the bed is bolted a feed rod supporting bracket 8 (see Fig. 1) having a suitable bore parallel with the bed and bolted to the rear end of the grip carrying block 5 and provided with a similar bore in alinement with the bore in bracket 8 is another bracket 7. Sliding freely in the bores of these two brackets 7 and 8 is a feed rod 22 secured to which is an adjustable collar 23 and between which and the spool 25 is a compression spring 24, and in the rear of spool 25 and secured to the rod is another adjusting collar 23$^a$.

Referring again to Figs. 5 and 6 the grip block is provided with a plate housing an adjusting screw and nuts 60$^a$ and 61$^a$, the inner end of the screw 60$^a$ being in position to contact with the end of the stationary grip block 26 for the purpose of adjusting it. The inner end of the grip block 26, like that of block 26$^a$, is machined to conform to the diameter of the work that is to be threaded and into the inner or opposing ends of each of the blocks is housed a spring pressed plunger 26$^b$ secured in position by means of a pin and elongated slot, the plungers being so located that they will project slightly into the milled groove at the ends of the blocks. These milled grooves or recesses at the ends of the respective grip blocks are centrally located and in alinement with the central bore of the die spindle and the adjusting screw 60$^a$ on the end of the non-movable grip block 26 facilitates the locating of the grooved end of the block in exact alinement with the bore of the spindle. In the side of the block 5 is housed a spring 63, one end of which engages a wall of the block 5 and the other end impinges against a pin 62 adapted to move in a slot 62$^a$ formed in the block 5. This pin projects into the grip block 26$^a$. To the outer end of the sliding or movable grip block 26$^a$ is secured the thumb screw 60 and its nut 61. The spring 63 forces the grip block 26$^a$ away from the work that is to be gripped when the lever 9 (see Fig. 1) has its roller 11 in the position shown at A (see Fig. 5). When the lever 9 and its roller 11 have traveled to the point marked B, (Fig. 5) relative to the lever 10, the grip block 26$^a$ will be moved forward or inward to hold the work steadily without, however, gripping it to prevent it being fed properly. Owing to the taper on the lever 10 when the roller 11 on the lever 9 has traveled to the point indicated by C (Fig. 5), the lever 10 will then force the grip block 26$^a$ tightly against the work to be threaded. This movement of the lever 10 is accomplished by means of a continuous cam on the cam shaft, having a slight dwell between the points B and C and this dwell between the points B and C is where the lever 10 remains immovable and during that time the stock is fed through the grip blocks or jaws against the stop rod 45 hereinafter described, and which has been previously adjusted to the required length. A suitable bore in line with the bore in the spindle and with the grooved bore formed in the ends of the grip blocks or jaws is bored through the block 5 and this bore is bushed to suit the different diameters of work to be threaded. Between the bracket 7 and the grip blocks 26 and 26ᵃ the block 5 is machined with an opening or slot from the top thereof to the central bushed bore just referred to, and the top of the bushing just referred to is also machined to correspond with this slot in the top of the block to permit the stock or work to drop into the bushing from a suitable magazine designated generally herein by 100. A description of this magazine and its operation is deemed unnecessary herein, since it forms the subject matter of a co-pending application of Benjamin F. Rindfleisch, filed April 4, 1917, Serial No. 159,607, and in which case a cross reference has been made to the present case.

From the foregoing it will be observed that by means of the cam shaft 38 and cam drum 40 and suitable cams not shown, the grip block 26ᵃ is moved inward to grip the work at the proper time while the spring 63 moves the grip block 26ᵃ away from the work at the proper time and that by the same cam drum 40 the feed rod 22 is operated after the work has dropped from the magazine into position to feed the work forward between the grip blocks and into position to be threaded by the threading die.

The threading mechanism is supported by the housing 4 hereinbefore referred to and in a bore thereof parallel with the bed and in alinement with the work feeding rod 22 the threading spindle 29 is housed (see for instance Fig. 13). Loosely mounted on the spindle 29 is spindle driving sleeve gear 41ᵇ. In other words this gear is provided with a laterally extending sleeve (see Fig. 14) which is slotted. This gear is held in place against the face of a rear extended portion of a spindle housing 4 by means of a shoe 42 bolted to the underside of bracket 6, which supports the stop rod hereinafter referred to. This shoe 42 has an extended portion resting against the outer side face of the gear 41ᵇ at a suitable distance from the periphery of the same. The bracket 6 has one end bolted to the rear upper side of the housing 4 while the other end of the bracket extends downward a suitable distance and is provided with a bore in alinement with the bore in the spindle housing and in this bore of the bracket 6 is located stop rod 45 hereinafter referred to. At the rear end of the threading spindle 29 is fastened thereto by suitable screws, spindle driving sleeve 43 (see Fig. 13), and into the front end of this sleeve 43 the rear end of the sleeve of gear 41 projects or telescopes. At the front end of the sleeve 43 is located a pair of rollers and studs 44 and these rollers project into the slots or grooves 44ᵃ of the gear sleeve (see Fig. 14) whereby on the rotation of the gear 41ᵇ by the means about to be described the sleeve 43 will be rotated to thereby rotate the spindle 29 while at the same time the movement of the spindle back and forth relatively to the gear 41ᵇ is permitted by the slots 44ᵃ. To the rear extended portion of the spindle housing 4 is pivoted a rocker arm 41ᶜ (see Fig. 3) and to the outer end of this rocker arm on a suitable stud is secured intermediate gear 41ᵃ in mesh with gear 41ᵇ. The opposite end of this rocker arm is provided with a suitable arcuate slot 41ᵈ into which projects a clamping bolt secured to the housing 4 and by means of which the rocker arm 41ᶜ may be clamped in different positions to allow the intermediate gear 41ᵃ to properly mesh with the companion gears. In the rear end of the bed 3 and below the housing 4 and extending transversely of the machine is housed worm shaft 36ᵃ. This worm shaft carries a worm 36 loosely mounted thereon, which is in mesh with a worm wheel 37 (see Fig. 4) fixed to the cam shaft 38 extending lengthwise of the machine. One end of the worm 36 rests against a collar 56 pinned to the worm shaft 36ᵃ, and which is located between the end of this worm and the worm shaft bearing. Pinned to the opposite end of the worm 36 by suitable pins 58 is a thrust sleeve 57 having a flange and the end of this thrust sleeve is housed in one of the bearings for the worm shaft 36ᵃ (see Fig. 4), a thrust washer 57ᵃ being located between the flanged portion of this thrust sleeve and said bearing. To the end of the thrust sleeve 57 that extends beyond the bearing are secured change gears 51 by means of suitable pins. These change gears are connected with the worm shaft and there is connected therewith suitable safety tripping mechanism, such as is used on similar National Acme machines, and therefore a description thereof is not deemed necessary herein. At the opposite end of the worm shaft 36ᵃ and mounted loosely on the shaft is thrust washer 55 located between the worm shaft bearing and spiral clutch gear 34, which is loosely mounted on the worm shaft. This spiral clutch gear at its opposite side is provided with a suitable bore in which is located a collar 54 pinned to the worm shaft 36ᵃ. Directly in front of the spiral gear 34 and keyed to the worm shaft 36ᵃ is sliding clutch member 52 and the opposing faces of this clutch member 52 and spiral gear 34 are provided with clutch teeth to mate with each other. Clutch member 52 is so formed that it will coöperate with a safety lever 53 pivotally carried in a slot of the worm shaft 36ª. The clutch member 52 is provided with a groove to receive an operating control lever 35 (see Fig. 1) and the outer end of the worm shaft 36ª is provided with a suitable flat portion for the reception of a hand lever 53ª. The hand lever is used when operating the machine by hand after the control lever 35 has disconnected the sliding clutch member 52 from the spiral clutch gear member 34. The control operating lever 35 is pivotally secured to a bracket 35ª bolted to the bed of the machine (see Fig. 1) and is provided with a forked end carrying studs and rollers, the latter extending into the grooved portion of the sliding clutch member 52 and by means of which the starting and stopping of the machine can be done at any time by hand. The bed 3 of the machine is provided with an extended bearing 30ª in which one end of a pulley shaft 31 is mounted (see Fig. 1) and the opposite end of this shaft 31 is mounted in a bracket 30 bolted to the pan 2 of the machine. Pinned to the pulley shaft 31 is a spiral gear 33 (see Figs. 1 and 4) which is in mesh with the spiral gear 34 loosely mounted on the worm shaft 36ª and pinned to an extended portion of this spiral gear 33 but loosely mounted on the shaft 31 is change gear 41, which is in mesh with the intermediate gear 41ª hereinbefore referred to carried by the rocker arm 41ᶜ. This change gear 41 is removable so that gears of different diameters may be substituted according to the speed at which the cam shaft is run. At the opposite side of this change gear 41 and fastened to the pulley shaft 31 is drive pulley 32 for connection with any suitable source of power, and this drive pulley is also pinned to the opposite face of change gear 41.

From the foregoing it will be observed that when the pulley 32 is rotated from a suitable source of power change gear 41 will, through gears 41ª and 41ᵇ, rotate the threading spindle and this pulley 32 will also at the same time, through the spiral gears 33 and 34 and worm 36, when the clutch member 52 is in engagement with the clutch teeth of the spiral gear 34, rotate the worm wheel and thereby the cam shaft 38.

Secured to the pan 2 (see Figs. 1 and 3) is an oil pump 48, which is driven by a chain 48′ connected with sprockets 49′ on the pump shaft and sprocket 49 on the pulley shaft 31, whereby from the same pulley shaft the oil pump is also operated and this oil pump is connected to the stop mechanism in a manner hereinafter described.

In the present machine, as hereinbefore stated, a swinging or oscillating stop is not used. Instead thereof a stop mechanism is provided which does not require the operating mechanism of the machine to wait for the stop to swing into and out of position, thus saving a great deal of time. In other words, in the present machine a non-movable positive stop is provided, which eliminates the time heretofore lost in bringing the stop into position and then carrying it away from its operative position. In the bore of the threading die spindle 29 is located a tube 45ª and to the forward end of this tube 45ª is connected a stop 45ᵇ, which passes centrally through the threading die 28. This stop 45ᵇ is detachably connected to the tube 45ª so that various diameters of stops may be used according to the size of work to be threaded. At the opposite end of the tube 45ª and connected thereto by a threaded coupling 45ᶜ is a rod 45 (see Fig. 13). In a bore of the bracket 6 is located a threaded sleeve 45ᵈ the opposite end having a knurled head 46 and projecting into this head 46 is an adjusting collar 46ª fastened to the rod 45 and so connected to the head 46 by a bolt and slot, the latter formed in the collar 46ª, that the adjusting sleeve 45ᵈ may be rotated. The oil pump hereinbefore described is connected by a flexible tube 47 with the threaded coupling 45ᶜ and thereby with the tube 45ª, the forward end of which is provided with suitable openings adjacent to the point of connection therewith of the stop rod 45ᵇ, so that oil may be fed directly through the tube 45ª to the threading die centrally thereof. By properly manipulating the members 46ª, 46 and 45ᵈ the stop 45ᵇ and its carrying tube 45ª together with the rod 45 may be lengthwise adjusted, toward or from the block 5 carrying the gripping mechanism, in other words, may be adjusted lengthwise of the die spindle so that the distance the work is required to be fed out against the stop rod 45 by the feed rod 22 hereinbefore described can be regulated in a manner which will be readily obvious. In addition to the rotation of the threading die in the manner hereinbefore described, the threading die 28 and its spindle 29 have a forward and backward or reciprocatory movement so as to properly thread the work carried by the gripping mechanism. At the opposite side of the bed carrying the control lever 35 and on top of the bed is located a bracket 65 and in front of the same and also bolted to the bed is a bracket 66 (see Figs. 2 and 5 and any one of Figs. 7, 8, 9, 10 and 12). In the extended bearings of the brackets 65 and 66 is mounted an operating shaft or rod 67. Secured to this shaft 67 between the brackets 65 and 66 is spindle operating arm 80 provided with a fork or crotch extending into a suitable groove 80ª at the end of the spindle 29. Below the shaft or rod 67 and also carried by the brackets 65 and 66 is a parallelly located die operating shaft or rod 68, to which is secured in a suitable position thereon a die operating arm 79, the end of which is forked or crotched to project into a groove 79$^a$ of the die. Mounted on the two shafts 67 and 68 is a dog 69. In the rear of the spindle operating arm 80 and fastened by set screw to the shaft 67 is a tension adjusting collar 83 and between this collar and the dog 69 is located a tension spring 82, and at the opposite side of the dog 69 and secured to the shaft 67 by a set screw is adjusting collar 81. To that part of the dog 69 that is mounted on the rod 68 is pivoted one end of a link or lever 70 by a bolt 71. To the other end of this link or lever 70 is pivoted the upper end of die spindle operating lever 73, which lever in turn is pivoted to the side of the bed by a pivot post 74 and to the lower end of this lever 73 is secured a stud and roller 75 adapted to be engaged by suitable cams at the proper time on the cam drum 39 carried by the cam shaft 38. To an extended portion of the bracket 65 at a suitable place thereon is located the adjustable die closing stop screw 84 and in the bracket 66 is located adjustable tripping stop screw 84$^a$ (see Figs. 2, 8, 9 and 12), the tripping stop screw 84$^a$ being located in alinement with the stop screw 84. A safety latch 77 of suitable shape is pivotally hung to the outer end of the die operating arm 79 (see Figs. 2 and 11 as well as any one of Figs. 8, 9 and 12 where this latch is shown in different positions as hereinafter explained). Above the adjustable stop screw 84 and carried by the extended portion of the bracket 65 and parallel with this adjustable stop screw 84 and maintained in place by a set screw is safety latch stop rod 86 (see Figs. 2, 5 and several other succeeding figures) and near the end of link or lever 70 in a suitable slot thereof is located safety latch pin 76, being secured in position by a nut and washer.

In Fig. 1 the die is illustrated as about to go on the work, in order to thread it, the die spindle having been carried away from the preceding threaded piece by the lever 73 coming in contact with a suitable cam on the cam drum 39 owing to the connection of this lever 73 through the link or lever 70 with the dog 69. The dog 69 being pivoted to the link or lever 70 and loosely mounted on the shafts 67 and 68 was forced against the face of the collar 81 tightly fastened to the shaft 67 and therefore shifted the shaft lengthwise in its bearings so as to carry the forked arm 80, also tightly fastened to the shaft, with it, and therefore through this movement of the forked arm 80 the spindle 29 was shifted away from the work. During this operation the die operating forked arm 79, which has its forked end projecting into the groove of the die 28 and its opposite end fastened to the shaft 68, had an extended portion of this arm 79 in contact with the adjustable top screw 84 and thereby arrested the travel of one part of the die and the further travel of the lever or link 70 so that, as one part of the die was held stationary against further movement the die spindle 29 was permitted to travel a short distance farther, which operated so as to close the die. The die is an opening and closing rotary type of die and is of that form that, when the die opens or releases, the outer cap or shell is arrested, allowing the inner portion or die body to travel outwardly or forwardly and thus release itself from the work. In closing the die, the shell or outer cap is arrested and the inner portion or die body is telescoped in the same. This die is of familiar construction heretofore patented by the National Acme Manufacturing Company, and a detail description thereof is therefore deemed unnecessary in this case.

When the die has been closed, as before explained, and is about to travel forward (as shown in Fig. 1) the lever 73 coming in contact with its cam on the cam drum 39 acting through the lever or link 70, the dog 69, the spring 82 and collar 83, which is fastened to the shaft 67, operates through the forked arm 80, also fastened to the shaft 67, to carry the spindle forward and the die therefore with it. When the work has been threaded the desired distance by the die the extended portion of the forked arm 79 comes in contact with the stop screw 84$^a$, whereupon the forward travel of the die as a whole is arrested but the die body travels forward a little farther by reason of the engagement of the die cutters or chasers with the threads of the work until the die chasers have released themselves from the cams in the die, whereupon the die is opened or released.

If, for some reason or other, the die has lagged or has not released itself from the work when it is time for the lever 73 to carry the die spindle back to its initial or closing position, the latch pawl 77, having fallen into its position automatically in front of the safety pin 76 carried by link or lever 70 (see Figs. 10 and 11),—the latch being fastened to the forked arm 79 engaging the die 28 and the pin 76 to the link or lever 70,—it follows that as the lever 73 carries the die spindle backward the pin 76 will come into contact with the latch 77 and so shift that part of the die 28 with which the arm 79 is in engagement, and thus open or release the die and so permit the die to clear itself from the work and allow another piece of work to be fed and the die to be closed in readiness to go forward again to thread the succeeding piece. When the die spindle has receded by means of the lever 73 and the other parts hereinbefore described, a downward extended portion of the latch 77 comes in contact at the proper time with the safety latch stop rod 86 hereinbefore described, whereby the safety latch 77 is shifted out of contact from the pin 76 of the link or lever 70, so as to allow the die spindle to travel farther backward until it reaches its initial backward position to close the die. When the die spindle travels forward again the latch automatically drops in position ready to serve its purpose in connection with the pin 76 should the die not properly work as just explained.

Figs. 7, 8, 9, 10, 11 and 12 show the different positions of the several parts just described and illustrated during the operation of the safety latch.

From the foregoing it will be seen that when a piece of work or blank to be threaded has dropped from the magazine into the gripping blocks, the feed rod 22 through the means hereinbefore described pushes the work forward through the grips and against the stop 45ᵇ located in the die spindle, whereupon the grip jaws or blocks close upon the blank and hold it tightly in position for the threading operation. Thereupon the die is carried forward by the means just explained and the threading operation takes place. When the die has traveled on the work the required distance the die opens and is released from the work, the die spindle recedes far enough to clear the work and again lock the die. When the die is clear of the work the grip jaws release the work through the medium of the levers 9 and 10 hereinbefore explained and the finished work drops into the pan, during which operation another piece is being carried into position for a repetition of the threading operation.

We claim as our invention:

1. In a metal working machine the combination of blank gripping means, blank feeding means and means for operating them, rotatable threading means, means for rotating it, means for shifting the threading means toward and from the work and for opening and closing the threading means relatively to the work, a non-movable blank stopping means, and safety mechanism for releasing the threading means from the work.

2. In a metal working machine the combination of blank gripping means, blank feeding means and means for operating them, rotatable threading means, means for rotating it, means for shifting the threading means toward and from the work and for opening and closing the threading means relatively to the work, a non-movable blank stopping means, and safety mechanism for releasing the threading means from the work, said stopping means being located within the threading means.

3. In a metal working machine the combination of means for supporting the work, means for operating thereon, means for rotating one of said means relatively to the other, means for reciprocating said operating means, and a stop located within said operating means centrally thereof for limiting the forward movement of the work and non-movable axially with said operating means.

4. In a metal working machine the combination of work supporting means, a rotatable tool for operating thereon, and a stop located within the tool for positioning the work prior to the operation of the tool thereon and non-movable with said tool.

5. In a metal working machine the combination of blank supporting means, a rotatable tool for operating thereon, means for reciprocating the tool toward and from the work, and a stop located within the tool and non-movable axially with said tool.

6. In a metal working machine the combination of blank supporting means, a rotatable tool for operating thereon, means for reciprocating the tool toward and from the work, and a stop adjustable relatively to but axially non-movable with the tool and located centrally thereof.

7. In a metal working machine the combination of blank supporting means, a rotatable tool for operating thereon, means for reciprocating the tool toward and from the work, and a stop carried by the tool and located centrally thereof and non-movable with the tool.

8. In a metal working machine the combination of blank supporting means, a rotatable threading die for operating thereon, means for reciprocating the tool toward and from the work, and a non-movable stop located centrally in the tool for positioning the work.

9. In a metal working machine the combination of blank gripping means, blank feeding means, a rotatable tool for operating upon the work, means for reciprocating the tool toward and from the work, and a stop centrally located relatively to the tool and adjustable relatively thereto but non-movable axially therewith for positioning the work as it is fed by said feeding means.

10. In a metal working machine the combination of blank gripping means, blank feeding means, a rotatable tool for operating upon the work, means for reciprocating the tool toward and from the work, and a stop centrally located relatively to the tool for positioning the work and non-movable with the tool.

11. In a metal working machine the combination of blank gripping means, blank feeding means, a rotatable tool for operating upon the work, means for reciprocating the tool toward and from the work, and a stop centrally located relatively to the tool for positioning the work and non-movable with the tool and the work.

12. In a metal working machine the combination of a magazine for supporting blanks, gripping mechanism for receiving and gripping the blanks, a feed rod for pushing the blanks into the gripping mechanism, a rotatable threading die, means for reciprocating it toward and from the work, and a stop projecting into the threading die for positioning the work.

13. In a metal working machine the combination of a magazine for supporting blanks, gripping mechanism for receiving and gripping the blanks, a feed rod for pushing the blanks into the gripping mechanism, a rotatable threading die, means for reciprocating it toward and from the work, and a stop projecting into the threading die for positioning the work and non-movable relatively to the die.

14. In a metal working machine the combination of blank supporting means and blank feeding means, a rotatable tool for operating upon the blank, and a stop projecting into said tool.

15. In a metal working machine the combination of blank supporting means and blank feeding means, a rotatable tool for operating upon the blank, and a stop carried by said tool, means for reciprocating the tool toward and from the work, said stop being non-movable with the tool and the work.

16. In a metal working machine, the combination of a rotatable tool, a work stop projecting thereinto and upon which said tool rotates for positioning the work prior to the operation of the tool thereon, and means for reciprocating the tool and the stop one relatively to the other whereby the stop will project a greater distance into the tool during the initial feeding of the work and a less distance thereinto when the work is completed.

17. In a metal working machine the combination of a rotatable tool, a work stop carried thereby, and means for reciprocating the tool relatively to the stop.

18. In a metal working machine the combination of a rotatable threading die, and a work stop carried thereby centrally thereof for positioning the work prior to the operation of the tool thereon.

19. In a metal working machine the combination of a rotatable threading die, a work stop projecting into the tool centrally thereof, and means for reciprocating the threading die.

20. In a metal working machine the combination of a rotatable threading die, a work stop carried thereby centrally thereof, and means for reciprocating the threading die, the stop being non-movable with the die.

21. In a metal working machine the combination of a threading die spindle carrying a threading die, a work stop comprising a rod located centrally of the spindle and the die, and means for reciprocating said die and its spindle on said work stop.

22. In a metal working machine the combination of a threading die spindle carrying a threading die, a work stop comprising a rod located centrally of the spindle and the die and non-movable with the die and spindle, and means for actuating the die.

23. In a metal working machine the combination of a threading die spindle carrying a threading die, a work stop comprising a rod located centrally of the spindle and the die and non-movable with the die and spindle, and means for rotating the die and spindle.

24. In a metal working machine the combination of a threading die spindle carrying a threading die, a work stop comprising a rod located centrally of the spindle and the die and non-movable with the die and spindle, means for rotating the die and spindle, and means for reciprocating the die and the spindle.

25. In a metal working machine the combination of a tool and a work stop located centrally thereof for positioning the work and comprising a body portion and a detachable portion.

26. In a metal working machine the combination of a tool and a work stop located centrally thereof for positioning the work, and means for actuating the tool, the stop being non-movable with the tool.

27. In a metal working machine, the combination of a rotatable spindle, a tool secured thereto, a work stop located centrally of said spindle and upon which said tool and spindle rotate for initially positioning the work prior to the operation of the tool thereon, and means for reciprocating the tool spindle and the stop one relatively to the other whereby the stop will project a greater distance into the tool during the initial feeding of the work and a less distance thereinto when the work is completed.

28. In a metal working machine the combination of a tool, a work stop located centrally thereof, and means for reciprocating the tool.

29. In a metal working machine the combination of a tool, a work stop located centrally thereof, means for rotating the tool, and means for reciprocating it.

30. In a metal working machine the combination of a tool, a work stop located cen- 31. In a metal working machine the combination of blank supporting means, blank threading means, means for rotating the blank and the threading means one relatively to the other, means for reciprocating the threading means toward and from the work, said threading means including an openable and closable die and means for opening and closing the die, and safety mechanism for opening the die.

32. In a metal working machine the combination of blank supporting means, blank threading means, means for rotating the blank and the threading means one relatively to the other, means for reciprocating the threading means toward and from the work, said threading means including an openable and closable die, and safety mechanism for opening the die, and comprising a latch pivoted to automatically position itself.

33. In a metal working machine the combination of blank supporting means, a rotatable threading die, means for shifting it toward and from the work and having means for opening and closing the die, and safety mechanism for releasing the die from the work.

34. In a metal working machine the combination of blank supporting means, a reciprocating and rotating die spindle and die, means for reciprocating it and for rotating it and including means for opening and closing the die, and safety mechanism for also opening the die.

35. In a metal working machine the combination of blank supporting means, a reciprocating and rotating die spindle and die, means for reciprocating it and for rotating it and including means for opening and closing the die, and safety mechanism for also opening the die and comprising a latch and means coöperating therewith.

36. In a metal working machine the combination of blank supporting means, a reciprocating and rotating die spindle and die, means for reciprocating it and for rotating it and including means for opening and closing the die, and safety mechanism for also opening the die and comprising a latch and means coöperating therewith, said latch being pivotally supported to automatically position itself.

37. In a metal working machine the combination of blank supporting means, a reciprocating and rotating die spindle and die, means for reciprocating it and for rotating it and including means for opening and closing the die, safety mechanism for also opening the die and comprising a latch and means coöperating therewith, said latch being pivotally supported to automatically position itself, and means for tripping the latch.

38. In a metal working machine the combination of blank supporting means, a reciprocating and rotatable threading die, means for reciprocating it and for rotating it and for opening and closing the die upon the work, safety mechanism also effective to release the die from the work and comprising a member located to automatically position itself, and means for tripping said member.

39. In a metal working machine the combination of a rotatable spindle carrying a tool, means for rotating the spindle and tool and including a gear loosely mounted upon the spindle, and a pair of sleeves, one secured to the gear and the other to the spindle and having overlapping ends for sliding engagement relatively to each other and provided with means connecting one sleeve to the other and including a lengthwise extending slot or slots, each having straight parallel side walls carried by one of said sleeves.

40. In a metal working machine the combination of a rotatable spindle carrying a tool, means for rotating the spindle and including a gear loosely mounted on the spindle, a slotted sleeve having a pair of lengthwise extending slots, each having straight parallel side walls and a sleeve having rollers projecting into the slots of the first sleeve, one sleeve secured to the spindle and the other to the gear, the end of one overlapping the end of the other whereby the spindle may be rotated and may slide back and forth relatively to the gear.

41. In a metal working machine, the combination of work supporting means, a hollow formed tool supported in position to operate upon the work carried by said supporting means, means for rotating the work and the tool one relative to the other, means for reciprocating the tool toward and from the work, a work stop located within the tool but not partaking of the reciprocations thereof, means for feeding the work into position to engage the stop when the tool is in its retarded position thereby to position the work, the tool moving forward along the work and away from the stop as the tool operation progresses upon the work.

42. In a metal working machine the combination of a tool spindle, a threading die carried thereby, a stop located within the threading die, a tube extending through the spindle and to which the stop is connected, and means connected with the tube for supplying oil therethrough to the die.

43. In a metal working machine the combination of a rotating spindle, a threading die carried thereby, means for rotating it and comprising a gear loosely mounted on the spindle, a pair of sleeves, one having a slot and the other a projection extending into the slot and one connected with the spindle and the other with the gear, and means for supplying oil to the die centrally through the spindle.

44. In a metal working machine the combination of a rotating spindle, a threading die carried thereby, means for rotating it and comprising a gear loosely mounted on the spindle, a pair of sleeves, one having a slot and the other a projection extending into the slot and one connected with the spindle and the other with the gear, and means for supplying oil to the die centrally through the spindle and comprising a tube carried by the spindle.

45. In a metal working machine the combination of a rotating spindle, a threading die carried thereby, means for rotating it and comprising a gear loosely mounted on the spindle, a pair of sleeves, one having a slot and the other a projection extending into the slot and one connected with the spindle and the other with the gear, and means for supplying oil to the die centrally through the spindle and comprising a tube carried by the spindle and a stop carried by the tube.

46. In a metal working machine the combination of a rotating spindle, a threading die carried thereby, means for rotating it and comprising a gear loosely mounted on the spindle, a pair of sleeves, one having a slot and the other a projection extending into the slot and one connected with the spindle and the other with the gear, means for supplying oil to the die centrally through the spindle and comprising a tube carried by the spindle, a stop carried by the tube, and means for adjusting the stop forwardly and backwardly.

47. In a metal working machine the combination of a rotatable die, a rotatable spindle carrying the same, means for rotating it, a stop carried by the spindle for positioning the work prior to the operation of the die thereon, and means for adjusting the stop forwardly and backwardly.

48. In a metal working machine, the combination of work supporting means, a hollow formed tool supported in position to operate upon the work carried by said supporting means, means for rotating the work and the tool one relative to the other, means for reciprocating the tool toward and from the work, a work stop located within the tool but not partaking of the reciprocations thereof, means for feeding the work into position to engage the stop when the tool is in its retarded position thereby to position the work, the tool moving forward along the work and away from the stop as the tool operation progresses upon the work, and means for supplying oil within the tool and around the work stop from a point rearwardly of the tool.

49. In a metal working machine the combination of a rotatable die, a rotatable spindle carrying the same, means for rotating it, a stop carried by the spindle, and means for adjusting the stop forwardly and backwardly and located at the rear of the spindle and including a tube between the adjusting means and the stop.

50. In a metal working machine the combination of a rotatable die, a rotatable spindle carrying the same, means for rotating it, a stop carried by the spindle, means for adjusting the stop forwardly and backwardly and located at the rear of the spindle and including a tube between the adjusting means and the stop, and means for supplying oil to the tube and thereby to the die.

51. In a metal working machine the combination of a rotatable and reciprocatory tool, a hollow spindle carrying the same, means for rotating and reciprocating the tool, a work positioning stop located centrally of the tool and in the bore of the spindle, and means for adjusting the stop.

52. In a metal working machine the combination of a rotatable and reciprocatory tool, a hollow spindle carrying the same, means for rotating and reciprocating the tool, a work positioning stop located centrally of the tool and in the bore of the spindle, and a detachable and changeable stop located centrally of the tool and in the bore of the spindle.

53. In a metal working machine the combination of a rotatable and reciprocatory tool, a hollow spindle carrying the same, means for rotating and reciprocating the tool, a work positioning stop located centrally of the tool and in the bore of the spindle, a detachable and changeable stop located centrally of the tool and in the bore of the spindle, and means for adjusting the stop backwardly and forwardly relatively to the tool.

54. In a metal working machine the combination of a rotatable and reciprocatory tool, a spindle carrying the same and having a bore, a stop located centrally of the tool, a tube carrying said stop and extending through the bore of the spindle, and means for supplying oil to the tube thereby to lubricate the tool.

55. In a metal working machine the combination of a rotatable and reciprocatory tool, a spindle carrying the same and having a bore, a stop located centrally of the tool, a tube carrying said stop and extending through the bore of the spindle, means for supplying oil to the tube thereby to lubricate the tool, and means for adjusting the stop thereby to position the stop relatively to the work.

56. In a metal working machine the combination of a rotatable and reciprocatory tool, a spindle carrying the same and having a bore, a stop located centrally of the tool, a tube carrying said stop and extending through the bore of the spindle, means for supplying oil to the tube thereby to lubricate the tool, means for adjusting the stop thereby to position the stop relatively to the work, means for reciprocating the tool and its spindle, and means for rotating it and including an antifriction device.

57. In a metal working machine the combination of a rotatable and reciprocatory tool, a spindle carrying the same, means for reciprocating the tool, means for rotating it and including an antifriction device, and means for supplying oil to the tool from the rear end of the spindle.

58. In a metal working machine the combination of a rotatable and reciprocatory tool, a spindle carrying the same, means for reciprocating the tool, means for rotating it and including an antifriction device and gearing, said antifriction device having positive connection with the spindle and with a gear of the gearing whereby the spindle may be reciprocated relatively to the gear, and means for supplying oil to the tool from the rear end of the spindle.

59. In a metal working machine the combination of a tool and blank feeding and gripping means, the latter comprising a pair of gripping blocks, one shiftable toward and from the other, means for shifting it, and means for feeding the blank in the direction of its length into the gripping means from the rear thereof.

60. In a metal working machine the combination of a tool and blank feeding and gripping means, the latter comprising a pair of gripping blocks, one shiftable toward and from the other, means for shifting it and comprising a spring for shifting it in one direction and cam operating means for shifting it in the other direction, and means for feeding the blank in the direction of its length into the gripping means from the rear thereof.

61. In a metal working machine the combination of a tool and blank feeding and gripping means, the latter comprising a pair of gripping blocks, one shiftable toward and from the other, means for shifting it and comprising a spring for shifting it in one direction and cam operating means for shifting it in the other direction, means for adjusting the other gripping block, and means for feeding the blank in the direction of its length into the gripping means from the rear thereof.

62. In a metal working machine the combination of a tool, blank feeding and gripping means comprising a magazine having an opening at its underside, a bushing open at its top side for receiving a blank from the magazine, a feed rod for pushing the blank forward, means for operating the rod, gripping means for gripping the blank, and means for operating it.

63. In a metal working machine the combination of a tool, blank feeding and gripping means comprising a magazine having an opening at its underside, a bushing open at its top side for receiving a blank from the magazine, a feed rod for pushing the blank forward, means for operating the rod, gripping means for gripping the blank, and means for operating it, said gripping means comprising a pair of gripping blocks for gripping the sides of the blank.

64. In a metal working machine the combination of a tool, blank feeding and gripping means comprising a magazine having an opening at its underside, a bushing open at its top side for receiving a blank from the magazine, a feed rod for pushing the blank forward, means for operating the rod, gripping means for gripping the blank, and means for operating it, said gripping means comprising a pair of gripping blocks for gripping the sides of the blank, each having a spring pressed plunger therein.

65. In a metal working machine the combination of a tool, blank feeding and gripping means comprising a magazine having an opening at its underside, a bushing open at its top side for receiving a blank from the magazine, a feed rod for pushing the blank forward, means for operating the rod, gripping means for gripping the blank, means for operating it, said gripping means comprising a pair of gripping blocks for gripping the sides of the blank, and a combined spring and cam operated means for shifting one of said blocks toward and from the other.

66. In a metal working machine the combination of a tool, blank feeding and gripping means comprising a magazine having an opening at its underside, a bushing open at its top side for receiving a blank from the magazine, a feed rod for pushing the blank forward, means for operating the rod, gripping means for gripping the blank, means for operating it, said gripping means comprising a pair of gripping blocks for gripping the sides of the blank, and a combined spring and cam operated means for shifting one of said blocks toward and from the other, each of said blocks carrying a spring operated plunger.

67. In a metal working machine the combination of a tool, blank feeding and gripping means comprising a magazine having an opening at its underside, a bushing open at its top side for receiving a blank from the magazine, a feed rod for pushing the blank forward, means for operating the rod, gripping means for gripping the blank, means for operating it, said gripping means comprising a pair of gripping blocks for gripping the sides of the blank, a combined spring and cam operated means for shifting one of said blocks toward and from the other, each of said blocks carrying a spring operated plunger, and one of said blocks having means for adjusting it toward and from the other.

68. In a metal working machine the combination of a tool and blank gripping means, means for operating the gripping means and effective first to hold the blank during the feeding thereof and then effective to grip the blank for the operation of the tool thereon, and means for feeding the blank intermediate the holding and gripping operations.

69. In a metal working machine the combination of a tool and blank gripping means, means for operating the gripping means and effective first to hold the blank during the feeding thereof and then effective to grip the blank for the operation of the tool thereon, and means for feeding the blank intermediate the holding and gripping operations, said gripping means comprising a pair of gripping blocks effective to grip the sides of the blank.

70. In a metal working machine the combination of a tool and blank gripping means, means for operating the gripping means and effective first to hold the blank during the feeding thereof and then effective to grip the blank for the operation of the tool thereon, and means for feeding the blank intermediate the holding and gripping operations, said gripping means comprising a pair of gripping blocks effective to grip the sides of the blank, said grip operating means comprising a spring and a cam operated lever.

71. In a metal working machine the combination of a magazine having a blank opening at its underside, a bushing having an opening at its top for the reception of the blank for the magazine, a feed rod projecting into the blank for pushing the blank axially of the bushing, and means for gripping the blank.

72. In a metal working machine the combination of a magazine having a blank opening at its underside, a bushing having an opening at its top for the reception of the blank for the magazine, a feed rod projecting into the blank for pushing the blank axially of the bushing, and means for gripping the blank, said means constructed to first hold the blank during the feeding thereof and then effective to grip the blank.

73. In a metal working machine the combination of a magazine having a blank opening at its underside, a bushing having an opening at its top for the reception of a blank from the magazine, a feed rod projecting into the blank for pushing the blank axially of the bushing, and means for gripping the blank, said means constructed to first hold the blank during the feeding thereof and then effective to grip the blank and including cam operated means.

74. In a metal working machine the combination of a magazine having a blank opening at its underside, a bushing having an opening at its top for the reception of a blank from the magazine, a feed rod projecting into the blank for pushing the blank axially of the bushing, and means for gripping the blank, said means constructed to first hold the blank during the feeding thereof and then effective to grip the blank and including cam operated means for shifting a part of the gripping means in one direction and spring actuated means for shifting it in the opposite direction.

75. In a metal working machine the combination of a rotatable and reciprocatory die, means for rotating and reciprocating the die, a magazine for supporting blanks and having an opening at its underside, means for receiving a blank from the underside of the magazine, feeding means for pushing the blank forward in the direction of its length, means for gripping the sides of the blank, and means for operating the gripping means.

76. In a metal working machine the combination of a rotatable and reciprocatory die, means for rotating and reciprocating the die, a magazine for supporting blanks and having an opening at its underside, means for receiving a blank from the underside of the magazine, feeding means for pushing the blank forward in the direction of its length, means for gripping the sides of the blank, means for operating the gripping means, and a stop located centrally of the die for limiting the movement of the blank.

77. In a metal working machine the combination of a rotatable and reciprocatory die, means for rotatating and reciprocating the die, a magazine for supporting blanks and having an opening at its underside, means for receiving a blank from the underside of the magazine, feeding means for pushing the blank forward in the direction of its length, means for gripping the sides of the blank, means for operating the gripping means, and a stop located centrally of the die for limiting the movement of the blank and non-movable relatively to the die.

78. In a metal working machine the combination of a rotatable and reciprocatory die, means for rotating and reciprocating the die, a magazine for supporting blanks and having an opening at its underside, means for receiving a blank from the underside of the magazine, feeding means for pushing the blank forward in the direction of its length, means for gripping the sides of the blank, means for operating the gripping means, a stop located centrally of the die for limiting the movement of the blank and non-movable relatively to the die, and means for feeding oil to the die from the rear end thereof.

79. In a metal working machine the combination of a rotatable and reciprocatory die, means for rotating and reciprocating the die, a magazine for supporting blanks and having an opening at its underside, means for receiving a blank from the underside of the magazine, feeding means for pushing the blank forward in the direction of its length, means for gripping the sides of the blank, means for operating the gripping means, a stop located centrally of the die for limiting the movement of the blank and non-movable relatively to the die, and means for feeding oil to the die from the rear end thereof and around the stop.

80. In a metal working machine the combination of a rotatable and reciprocatory die, means for rotating and reciprocating the die, a magazine for supporting blanks and having an opening at its underside, means for receiving a blank from the underside of the magazine, feeding means for pushing the blank forward in the direction of its length, means for gripping the sides of the blank, means for operating the gripping means, a stop located centrally of the die for limiting the movement of the blank and non-movable relatively to the die, means for feeding oil to the die from the rear end thereof and around the stop, and means for adjusting the stop axially of the die.

81. In a metal working machine the combination of a rotatable and reciprocatory die, means for rotating and reciprocating the die, a magazine for supporting blanks and having an opening at its underside, means for receiving a blank from the underside of the magazine, feeding means for pushing the blank forward in the direction of its length, means for gripping the sides of the blank, means for operating the gripping means, a stop located centrally of the die for limiting the movement of the blank and non-movable relatively to the die, means for feeding oil to the die from the rear end thereof and around the stop, means for adjusting the stop axially of the die, and means for rotating and reciprocating the die and including an antifriction means.

82. In a metal working machine the combination of a rotatable and reciprocatory die means for rotating and reciprocating the die, a magazine for supporting blanks and having an opening at its underside, means for receiving a blank from the underside of the magazine, feeding means for pushing the blank forward in the direction of its length, means for gripping the sides of the blank, means for operating the gripping means, a stop located centrally of the die for limiting the movement of the blank and non-movable relatively to the die, means for feeding oil to the die from the rear end thereof and around the stop, means for adjusting the stop axially of the die, means for rotating and reciprocating the die and including an antifriction means, and safety mechanism for releasing the die from the work.

83. In a metal working machine the combination of a rotatable threading die, a spindle carrying the die, means for rotating the die and the spindle and comprising a cam shaft having a worm wheel thereon, a transverse worm shaft having a worm thereon in mesh with the worm wheel, means operative from the worm for rotating the die and including gearing having a gear loosely mounted on the spindle, and antifriction means connecting said gear with the spindle.

84. In a metal working machine the combination of a rotatable threading die, a spindle carrying the die, means for rotating the die and the spindle and comprising a cam shaft having a worm wheel thereon, a transverse worm shaft having a worm thereon in mesh with the worm wheel, means operative from the worm for rotating the die and including gearing having a gear loosely mounted on the spindle, and antifriction means connecting said gear with the spindle and comprising a pair of sleeves, one having a slot and the other a roll extending into the slot and one connected to the spindle and the other to the gear.

85. In a metal working machine the combination of a rotatable threading die, a spindle carrying the die, means for rotating the die and the spindle and comprising a cam shaft having a worm wheel thereon, a transverse worm shaft having a worm thereon in mesh with the worm wheel, means operative from the worm for rotating the die and including gearing having a gear loosely mounted on the spindle, antifriction means connecting said gear with the spindle and comprising a pair of sleeves, one having a slot and the other a roll extending into the slot and one connected to the spindle and the other to the gear, and means for forcing oil through the spindle to the die.

86. In a metal working machine the combination of a rotatable threading die, a spindle carrying the die, means for rotating the die and the spindle and comprising a cam shaft having a worm wheel thereon, a transverse worm shaft having a worm thereon in mesh with the worm wheel, means operative from the worm for rotating the die and including gearing having a gear loosely mounted on the spindle, antifriction means connecting said gear with the spindle and comprising a pair of sleeves, one having a slot and the other a roll extending into the slot and one connected to the spindle and the other to the gear, said die comprising an openable die, and means for reciprocating the die and for opening and closing it.

87. In a metal working machine the combination of a rotatable threading die, a spindle carrying the die, means for rotating the die and the spindle and comprising a cam shaft having a worm wheel thereon, a transverse worm shaft having a worm thereon in mesh with the worm wheel, means operative from the worm for rotating the die and including gearing having a gear loosely mounted on the spindle, antifriction means connecting said gear with the spindle and comprising a pair of sleeves, one having a slot and the other a roll extending into the slot and one connected to the spindle and the other to the gear, said die comprising an openable die, and means for reciprocating the die and for opening and closing it, said means being operative from the cam shaft.

88. In a metal working machine the combination of a rotatable threading die, a spindle carrying the die, means for rotating the die and the spindle and comprising a cam shaft having a worm wheel thereon, a transverse worm shaft having a worm thereon in mesh with the worm wheel, means operative from the worm for rotating the die and including gearing having a gear loosely mounted on the spindle, antifriction means connecting said gear with the spindle and comprising a pair of sleeves, one having a slot and the other a roll extending into the slot and one connected to the spindle and the other to the gear, said die comprising an openable die, means for reciprocating the die and for opening and closing it, said means being operative from the cam shaft, and safety mechanism comprising an automatically operative device effective to open the die.

89. In a metal working machine the combination of a rotatable threading die, a spindle carrying the die, means for rotating the die and the spindle and comprising a cam shaft having a worm wheel thereon, a transverse worm shaft having a worm thereon in mesh with the worm wheel, means operative from the worm for rotating the die and including gearing having a gear loosely mounted on the spindle, antifriction means connecting said gear with the spindle and comprising a pair of sleeves, one having a slot and the other a roll extending into the slot and one connected to the spindle and the other to the gear, said die comprising an openable die, means for reciprocating the die and for opening and closing it, said means being operative from the cam shaft, safety mechanism comprising an automatically operative device effective to open the die, and a stop carried by the die and the spindle centrally thereof and non-movable relatively thereto.

90. In a metal working machine the combination of a rotatable threading die, a spindle carrying the die, means for rotating the die and the spindle and comprising a cam shaft having a worm wheel thereon, a transverse worm shaft having a worm thereon in mesh with the worm wheel, means operative from the worm for rotating the die and including gearing having a gear loosely mounted on the spindle, antifriction means connecting said gear with the spindle and comprising a pair of sleeves, one having a slot and the other a roll extending into the slot and one connected to the spindle and the other to the gear, said die comprising an openable die, means for reciprocating the die and for opening and closing it, said means being operative from the cam shaft, safety mechanism comprising an automatically operative device effective to open the die, a stop carried by the die and the spindle centrally thereof and non-movable relatively thereto, and means for forcing oil through the spindle and around the stop to the die.

91. In a metal working machine the combination of a rotatable threading die, a spindle carrying the die, means for rotating the die and the spindle and comprising a cam shaft having a worm wheel thereon, a transverse worm shaft having a worm thereon in mesh with the worm wheel, means operative from the worm for rotating the die and including gearing having a gear loosely mounted on the spindle, antifriction means connecting said gear with the spindle and comprising a pair of sleeves, one having a slot and the other a roll extending into the slot and one connected to the spindle and the other to the gear, said die comprising an openable die, means for reciprocating the die and for opening and closing it, said means being operative from the cam shaft, safety mechanism comprising an automatically operative device effective to open the die, a stop carried by the die and the spindle centrally thereof and non-movable relatively thereto, means for forcing oil through the spindle and around the stop to the die, a magazine having an opening at the bottom thereof, means for receiving a blank from the bottom of the magazine, means for feeding a blank lengthwise thereof to the die, means for gripping a blank at the sides thereof, and means effective to first hold the blank during the feeding thereof and then to grip the blank.

92. In a metal working machine the combination of a rotatable threading die, a spindle carrying the die, means for rotating the die and the spindle and comprising a cam shaft having a worm wheel thereon, a transverse worm shaft having a worm thereon in mesh with the worm wheel, means operative from the worm for rotating the die and including gearing having a gear loosely mounted on the spindle, antifriction means connecting said gear with the spindle and comprising a pair of sleeves, one having a slot and the other a roll extending into the slot and one connected to the spindle and the other to the gear, said die comprising an openable die, means for reciprocating the die and for opening and closing it, said means being operative from the cam shaft, safety mechanism comprising an automatically operative device effective to open the die, a stop carried by the die and the spindle centrally thereof and non-movable relatively thereto, means for forcing oil through the spindle and around the stop to the die, a magazine having an opening at the bottom thereof, means for receiving a blank from the bottom of the magazine, means for feeding a blank lengthwise thereof to the die, means for gripping a blank at the sides thereof, and means effective to first hold the blank during the feeding thereof and then to grip the blank and also operative from the cam shaft and including a cam lever for operating a part of the gripping means in one direction and spring actuated means for operating it in the opposite direction.

93. In a metal working machine the combination of blank supporting and feeding means for feeding a blank lengthwise into position relatively to its supporting means and toward the die, a rotatable and reciprocatory die and spindle, fixed means for supporting it, said die being openable and closable relatively to the work, means for rotating the die and the spindle, a cam shaft, means for driving the shaft, means operative from the shaft for directly reciprocating the die and the spindle on its fixed support toward the positioned blank, and means also operative from the cam shaft for opening and closing the die.

94. In a metal working machine the combination of blank supporting and feeding means, a rotatable and reciprocatory die and spindle, said die being openable and closable relatively to the work, means for rotating the die and the spindle, a cam shaft, means for driving the shaft, means operative from the shaft for reciprocating the die and the spindle, means also operative from the cam shaft for opening and closing the die, and safety mechanism for also opening the die.

95. In a metal working machine the combination of blank supporting and feeding means, a rotatable and reciprocatory die and spindle, said die being openable and closable relatively to the work, means for rotating the die and the spindle, a cam shaft, means for driving the shaft, means operative from the shaft for reciprocating the die and the spindle, means also operative from the cam shaft for opening and closing the die, safety mechanism for also opening the die, and a non-movable stop carried by the die and spindle centrally thereof.

96. In a metal working machine the combination of blank supporting and feeding means, a rotatable and reciprocatory die and spindle, said die being openable and closable relatively to the work, means for rotating the die and the spindle, a cam shaft, means for driving the shaft, means operative from the shaft for reciprocating the die and the spindle, means also operative from the cam shaft for opening and closing the die, and safety mechanism for also opening the die and carried by the means for opening and closing the die.

97. In a metal working machine the combination of blank supporting and feeding means, a rotatable and reciprocatory die and spindle, said die being openable and closable relatively to the work, means for rotating the die and the spindle, a cam shaft, means for driving the shaft, means operative from the shaft for reciprocating the die and the spindle, means also operative from the cam shaft for opening and closing the die, safety mechanism for also opening the die and carried by the means for opening and closing the die, and means for tripping said safety device of the safety mechanism.

98. In a metal working machine the combination of blank gripping means, blank feeding means and means for operating them, rotatable threading means, means for rotating it, means for shifting the threading means toward and from the work and for opening and closing the threading means relatively to the work, a non-movable blank stopping means, safety mechanism for releasing the threading means from the work, and means for receiving a blank at the top side thereof and in position to permit the same to be fed into the blank gripping means.

99. In a metal working machine the combination of blank gripping means, blank feeding means and means for operating them, rotatable threading means, means for rotating it, means for shifting the threading means toward and from the work and for opening and closing the threading means relatively to the work, a non-movable blank stopping means, safety mechanism for releasing the threading means from the work, means for receiving a blank at the top side thereof and in position to permit the same to be fed into the blank gripping means and comprising a magazine open at the bottom, and a work support open at the top.

Signed at Cleveland, Ohio, this 10th day of April, one thousand nine hundred and seventeen.

OSCAR A. SMITH.
BENJAMIN F. RINDFLEISCH.